(12) United States Patent
Wong et al.

(10) Patent No.: US 7,739,942 B2
(45) Date of Patent: Jun. 22, 2010

(54) VEHICULAR HYDRAULIC SYSTEM WITH PRESSURE DUMP VALVE

(75) Inventors: Albert C. Wong, Saginaw, MI (US); James L. Davison, Freeland, MI (US); Rick L. Lincoln, Linwood, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 308 days.

(21) Appl. No.: 11/901,863

(22) Filed: Sep. 19, 2007

(65) Prior Publication Data

US 2008/0066462 A1    Mar. 20, 2008

Related U.S. Application Data

(60) Provisional application No. 60/846,034, filed on Sep. 20, 2006.

(51) Int. Cl.
*F15B 13/06* (2006.01)

(52) U.S. Cl. ......................................................... 91/516
(58) Field of Classification Search .................... 91/516
See application file for complete search history.

(56) References Cited

U.S. PATENT DOCUMENTS

| | | |
|---|---|---|
| 3,050,944 A | 8/1962 | Schwartz et al. |
| 3,633,363 A | 1/1972 | Larsen |
| 3,662,548 A | 5/1972 | Suzuki et al. |
| 3,785,393 A | 1/1974 | Tanguy |
| 3,879,948 A | 4/1975 | Flory |
| 3,915,186 A | 10/1975 | Thomas |
| 3,941,142 A | 3/1976 | Adachi et al. |
| 4,070,858 A | 1/1978 | Hand |
| 4,074,528 A | 2/1978 | Lourigan et al. |
| 4,075,840 A | 2/1978 | Jesswein |
| 4,139,988 A | 2/1979 | Adachi |
| 4,161,867 A | 7/1979 | Adachi |
| 4,174,018 A | 11/1979 | Liebert et al. |
| 4,181,371 A | 1/1980 | Adachi |
| 4,251,193 A | 2/1981 | Minnis et al. |
| 4,253,382 A | 3/1981 | Yip |
| 4,414,809 A | 11/1983 | Burris |
| 4,420,934 A | 12/1983 | Udono |
| 4,620,750 A | 11/1986 | Leiber |
| 4,967,643 A | 11/1990 | Siegel |
| 5,385,455 A | 1/1995 | Dinsmore et al. |
| 5,471,838 A | 12/1995 | Suzuki et al. |
| 5,535,845 A | 7/1996 | Buschur |

(Continued)

*Primary Examiner*—F. Daniel Lopez
(74) *Attorney, Agent, or Firm*—Cantor Colburn LLP

(57) ABSTRACT

A vehicular hydraulic system with a pump and first and second hydraulic applications arranged in series. The fluid upstream of the first application may be elevated to a first threshold pressure value. A pressure-dump valve is disposed downstream of the first application and fluid entering the valve flows through an inlet port, primary flow channel and outlet port of the valve to the second hydraulic application. The valve includes a valve member that axially slides within an elongate valve chamber, partitioning the primary flow channel from a low pressure volume. The valve also includes a low pressure port and a bypass port that diverts fluid past the second application. The valve member is biased into a position wherein fluid is diverted through the bypass port when the pressure in the primary flow channel exceeds a second threshold value. The first threshold value is greater than the second threshold value.

16 Claims, 3 Drawing Sheets

U.S. PATENT DOCUMENTS

| | | |
|---|---|---|
| 5,651,665 A | 7/1997 | Can et al. |
| 5,802,848 A | 9/1998 | McClendon et al. |
| 5,881,630 A | 3/1999 | Buschur et al. |
| 5,960,628 A | 10/1999 | Machesney et al. |
| 6,016,657 A | 1/2000 | Buschur |
| 6,343,469 B1 | 2/2002 | Penninger et al. |
| 6,814,413 B2 | 11/2004 | Davison et al. |
| 7,155,907 B2 | 1/2007 | Desjardins et al. |

VEHICULAR HYDRAULIC SYSTEM WITH PRESSURE DUMP VALVE

CROSS REFERENCE TO RELATED APPLICATIONS

This application claims priority under 35 U.S.C. 119(e) of U.S. provisional patent application Ser. No. 60/846,034 filed on Sep. 20, 2006 entitled VEHICULAR HYDRAULIC SYSTEM WITH PRIORITY VALVE AND PRESSURE DUMP VALVE the disclosure of which is hereby incorporated herein by reference.

BACKGROUND OF THE INVENTION

1. Field of the Invention

The present invention relates to hydraulic systems for vehicles and, more particularly, to a hydraulic system having a hydraulic fluid pump and at least one hydraulic device.

2. Description of the Related Art

Many trucks with hydraulic braking systems, particularly larger gasoline powered and diesel powered trucks, incorporate hydraulic braking assist systems, rather than vacuum assist systems commonly found in passenger automobiles. The use of vacuum assist braking systems can be problematic in vehicles having a turbo-charged engine and such vehicles will also often employ hydraulic braking assist systems. Furthermore, there is an aftermarket demand for hydraulic braking assist systems for vehicles, such as hotrods, that may not otherwise have a brake assist device or for which the use of a vacuum assist system presents difficulties. Such hydraulic braking assist systems are well known and sold commercially.

Typically, these hydraulic braking assist systems are connected in series between the steering gear and hydraulic pump and use flow from the pump to generate the necessary pressure to provide brake assist as needed. The flow from the pump is generally confined within a narrow range of flow rates and is not intentionally varied to meet changing vehicle operating conditions. Because of the series arrangement, the application of the brakes and engagement of the hydraulic braking assist system can affect the flow of hydraulic fluid to the steering gear, thereby affecting the amount of assist available to the steering gear. Specifically, when a heavy braking load is applied, it causes an increase in backpressure to the pump which can exceed a threshold relief pressure (e.g., 1,500 psi) of the pump. Above this level, a bypass valve of the pump opens to divert a fraction of the outflow back to the intake of the pump, where the cycle continues until the pressure from the brake assist device drops below the threshold value of the bypass valve. During this relief condition, a diminished flow of fluid is sent to the steering gear which may result in a detectable increase in steering effort by the operator of the vehicle to turn the steering wheel under extreme relief conditions.

To at least partially alleviate this condition, it is possible to place a flow-splitter or priority valve in the hydraulic system to divert a portion of the flow of fluid being discharged from the pump to the steering gear under heavy braking conditions. The disclosure of U.S. Pat. No. 6,814,413 B2 describes the use of such a flow-splitter and hereby incorporated herein by reference. While the use of a flow splitter to divert a portion of the fluid flow being discharged by the pump to the steering gear assist device during heavy braking conditions provides significant advantages, the use of such a flow splitter generally requires that the steering gear device have a pressure relief value that is at least large as the pressure relief value of the brake assist device.

Oftentimes, a steering gear assist device that is adequate for a particular vehicle will have a lower pressure relief value than the brake assist device required for that same vehicle. Thus, the requirement that the steering gear assist device have a pressure relief value that is at least as large as the pressure relief value of the brake assist device often has a direct impact on the selection of a steering gear assist device and results in the selection of a more expensive steering gear assist device.

SUMMARY OF THE INVENTION

The present invention provides a pressure dump valve having a simplified structure that can be used in a hydraulic system having a first hydraulic application and a second hydraulic application arranged in series and, wherein the pressure in the primary flow path upstream of the first hydraulic application can be elevated to a first threshold value and the pressure dump valve ensures that the pressure at the second hydraulic application does not exceed a second threshold value wherein the first threshold value is greater than the second threshold value.

The present invention comprises, in one form thereof, a vehicular hydraulic system with a hydraulic circuit having, arranged in series and in serial order along a primary flow path, a hydraulic pump, a first hydraulic application, and a second hydraulic application. A pressure-dump valve is also provided. The pressure-dump valve has a valve body and a valve member with the valve body defining an elongate valve chamber defining an axis. The valve member is axially slidable within the chamber between a first axial position and a second axial position and sealingly partitions the chamber into a primary flow channel and a low pressure volume. The valve body further defines an inlet port in fluid communication with the primary flow channel, an outlet port in fluid communication with the primary flow channel, a low pressure port in fluid communication with the low pressure volume and a bypass port. The bypass port is disposed at an axially intermediate position with the low pressure port being disposed on one side of the bypass port and the inlet port and the outlet port being disposed on the opposing axial side of the bypass port. The bypass port is sealed from fluid communication with the valve chamber when the valve member is in the first axial position and the bypass port is in fluid communication with the primary flow channel when the valve member is in the second axial position. The valve member is axially displaced from the first axial position to the second axial position when the fluid pressure in the primary flow channel is elevated to a second threshold value, and wherein the elongate valve chamber, the inlet port, the outlet port, the bypass port and the low pressure port are the sole fluid communication channels defined by the pressure-dump valve. The pressure-dump valve is operably disposed in the hydraulic circuit downstream of the first hydraulic application and upstream of the second hydraulic application wherein the primary flow path extends from the first hydraulic application to the inlet port, through the primary flow channel and the outlet port of the valve to the second hydraulic application. The bypass port is in fluid communication with the primary flow path at a point downstream of the second hydraulic application and upstream of the hydraulic pump. The hydraulic fluid pressure in the primary flow path immediately upstream of the first hydraulic application can be elevated to a first threshold value which is greater than the second threshold value.

In some embodiments of the invention, the vehicular hydraulic system also includes a flow-splitting valve operably disposed in the hydraulic circuit downstream of the pump and upstream of the first hydraulic application. The flow-splitting valve communicates substantially all hydraulic fluid flowing therethrough to the primary flow path at a point upstream of the first hydraulic application when the pressure of the hydraulic fluid flowing therethrough is below the first threshold value. The flow-splitting valve splits the hydraulic fluid flow therethrough into a first fluid flow which is communicated to the primary fluid path upstream of the first hydraulic application and a second fluid flow which is communicated to the primary fluid path at a point downstream of the first hydraulic application and upstream of the pressure-dump valve when the pressure of the hydraulic fluid flowing through the flow-splitting valve exceeds the first threshold value.

In yet other embodiments of the invention, the first hydraulic application is a hydraulic brake booster device and the second hydraulic application is a hydraulic steering gear device.

The invention comprises, in another form thereof, a hydraulic circuit having, arranged in series and in serial order along a primary flow path, a hydraulic pump, a flow-splitting valve, a first hydraulic application, a pressure-dump valve and a second hydraulic application. The flow-splitting valve communicates substantially all hydraulic fluid flowing therethrough to the primary flow path at a point upstream of the first hydraulic application when the pressure of the hydraulic fluid flowing therethrough is below a first threshold pressure value. The flow-splitting valve splits the hydraulic fluid flow therethrough into a first fluid flow which is communicated to the primary fluid path upstream of the first hydraulic application and a second fluid flow which is communicated to the primary fluid path at a point downstream of the first hydraulic application and upstream of the pressure-dump valve when the pressure of the hydraulic fluid flowing through the flow-splitting valve exceeds the first threshold value. The pressure-dump valve communicates substantially all hydraulic fluid flowing therethrough to the primary flow path at a point upstream of the second hydraulic application when the pressure of the hydraulic fluid flowing therethrough is below a second threshold pressure value. The pressure-dump valve splits the hydraulic fluid flow therethrough into a third fluid flow which is communicated to the primary fluid path upstream of the second hydraulic application and a fourth fluid flow which is communicated to the primary fluid path at a point downstream of the second hydraulic application and upstream of the pump when the pressure of the hydraulic fluid flowing through the pressure-dump valve exceeds the second threshold value. The first threshold value defined by the flow-splitting valve being greater than the second threshold value defined by the pressure-dump valve.

An advantage of the present invention is that it provides a pressure-dump valve that allows first and second hydraulic applications to be arranged in series in a vehicular hydraulic circuit wherein the relief pressure for the second hydraulic application is less than the pressure relief value for the first hydraulic application.

When applied to an integrated hydraulic brake and steering gear assist system this allows for the use of a steering gear assist device having a lower pressure relief value than the brake assist device. This will often provide cost savings in comparison to the use of a steering gear assist device having a hydraulic pressure relief value at least as large as the brake assist device.

BRIEF DESCRIPTION OF THE DRAWINGS

The above mentioned and other features of this invention, and the manner of attaining them, will become more apparent and the invention itself will be better understood by reference to the following description of an embodiment of the invention taken in conjunction with the accompanying drawings, wherein.

Figure 1:
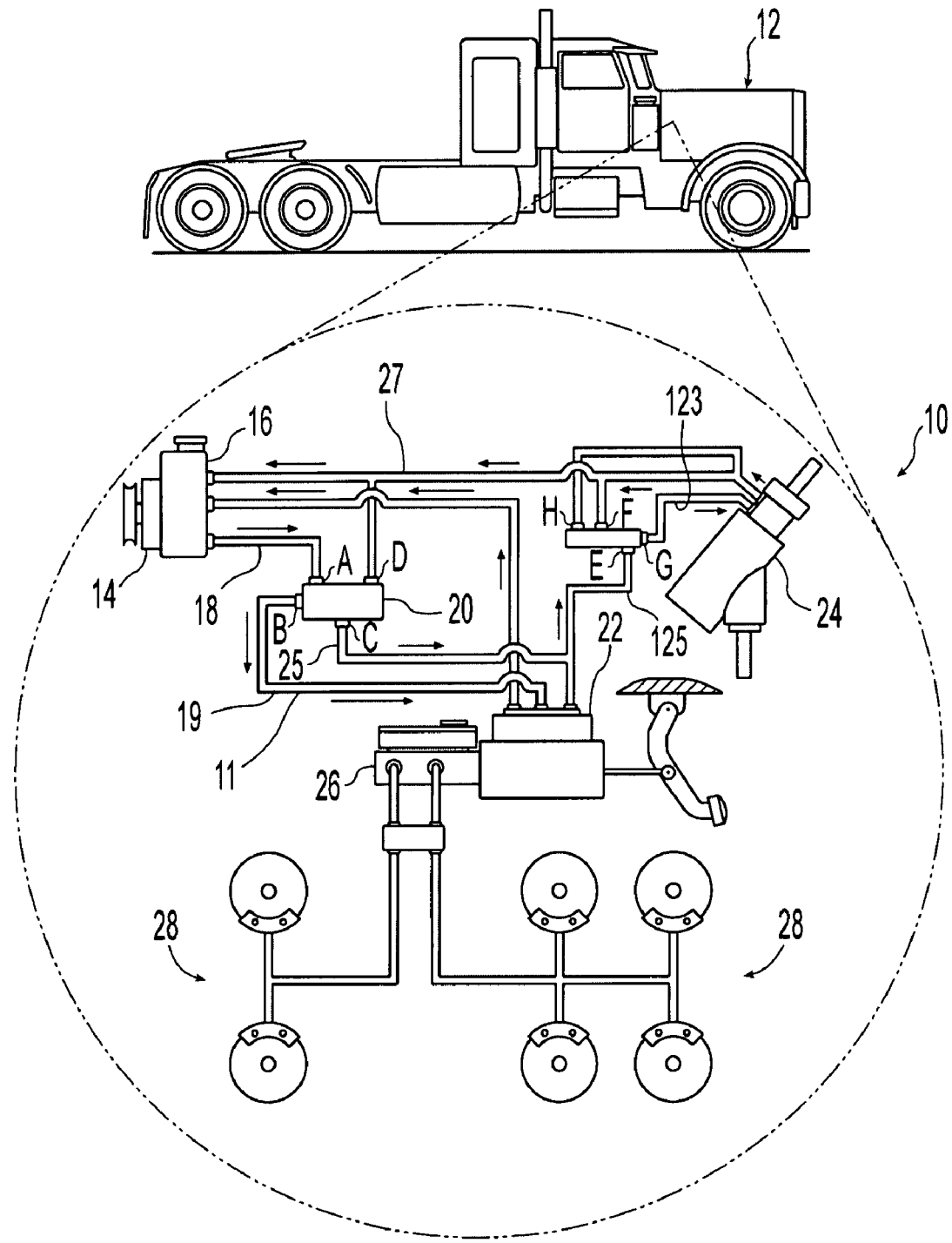
FIG. 1 is a schematic view of a hydraulic system in accordance with the present invention.

Corresponding reference characters indicate corresponding parts throughout the several views. Although the exemplification set out herein illustrates an embodiment of the invention, in one form, the embodiment disclosed below is not intended to be exhaustive or to be construed as limiting the scope of the invention to the precise form disclosed.

DETAILED DESCRIPTION OF THE INVENTION

FIG. 1 shows a hydraulic system 10 for a vehicle 12 for assisting in the steering and braking of the vehicle. The hydraulic system includes a hydraulic pump 14 and reservoir 16. The reservoir may be incorporated into the pump 14, as illustrated, or may be located remote from the pump 14.

The pump 14 delivers high pressure hydraulic fluid through discharge line 18 to a flow splitting valve 20 also known as a priority valve. The priority valve 20, in turn, selectively communicates with a first hydraulic application 22, a second hydraulic application 24, and the reservoir 16, depending on predetermined operating conditions of the system 10, as will be explained below.

The first and second hydraulic applications 22, 24 take the form of a hydraulic device or a hydraulic sub-circuit. In the illustrated embodiment, first application 22 is a hydraulic braking assist system or booster device, and the second application 24 is a hydraulic steering gear assist system or device.

The hydraulic brake booster device 22 communicates with a master cylinder 26 and brakes 28 of the braking system. Hydraulic booster device 22 is of a type well known in the art which is disposed in line between the hydraulic pump and the hydraulic master cylinder of a vehicular hydraulic brake system which acts to boost or amplify the force to the brake system in order to reduce brake pedal effort and pedal travel required to apply the brakes as compared with a manual braking system. Such systems are disclosed, for example, in U.S. Pat. Nos. 4,620,750 and 4,967,643, the disclosures of which are both incorporated herein by reference, and provide examples of a suitable booster device 22. Briefly, hydraulic fluid from the supply pump 14 is communicated to the booster device 22 through a booster inlet port and is directed through an open center spool valve slideable in a booster cavity (not shown). A power piston slides within an adjacent cylinder and is exposed to a fluid pressure on an input side of the piston and coupled to an output rod on the opposite side. An input reaction rod connected to the brake pedal extends into the housing and is linked to the spool valve via input levers or links. Movement of the input rod moves the spool valve, creating a restriction to the fluid flow and corresponding boost in pressure applied to the power piston. Steering pressure created by the steering gear assist system 24 is isolated from the boost cavity by the spool valve and does not affect braking but does create a steering assist backpressure to the pump 14. The priority valve 20 operates to manage the flow of hydraulic fluid from the pump 14 to each of the brake assist 22 and steering assist 24 systems in a manner that reduces the interdependence of the steering and braking systems on one another for operation.

Figure 2:
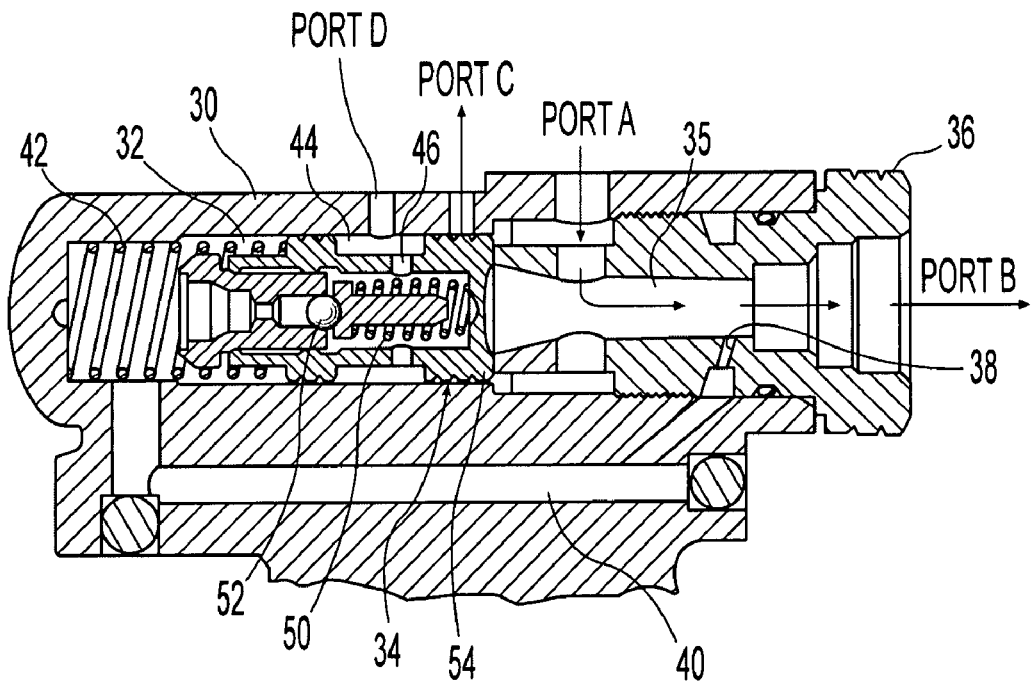
FIG. 2 is a partial cross sectional view of a priority valve under normal flow conditions.
Figure 3:
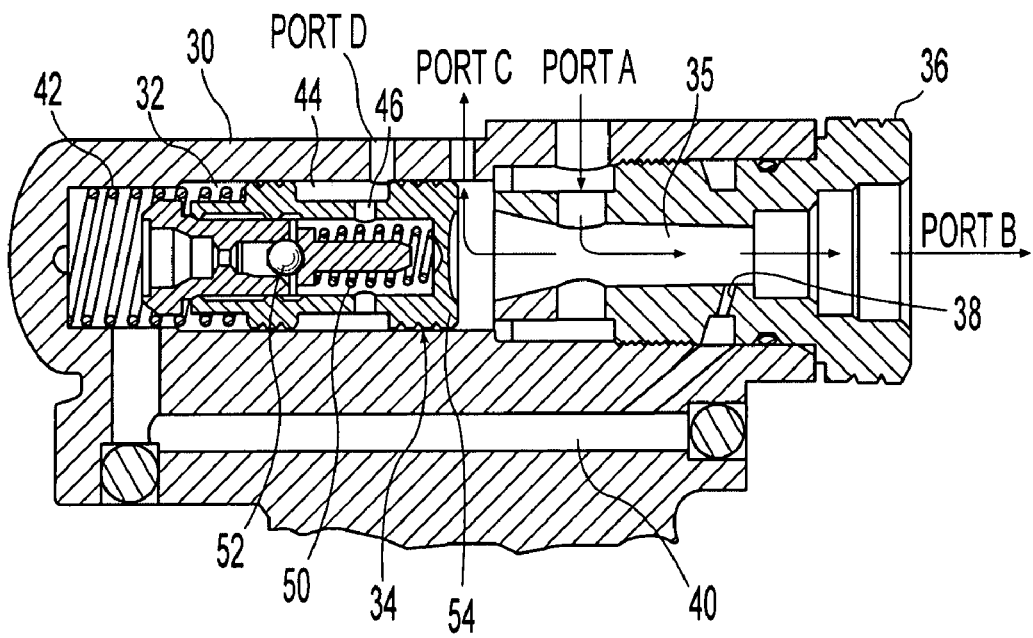
FIG. 3 is a partial cross sectional view of the priority valve of FIG. 2 wherein the priority valve is diverting a portion of the fluid flow through port C.

With reference to FIGS. 2 and 3, priority valve 20 includes a valve body 30 having a valve bore forming a chamber 32 in which a slideable flow control valve member 34 is accommodated. A plurality of ports are provided in the valve body 30, and are denoted in the drawing Figures as ports A, B, C and D. Fluid from the pump 14 is directed into the valve body 30 through port A, where it enters the chamber 32 and is directed out of the body 30 through one or more of the outlet ports B, C and D, depending upon the operating conditions which will now be described.

FIG. 2 shows normal operation of priority valve 20 under conditions where backpressure from the brake assist device 22 is below a predetermined control pressure. All of the flow entering port A passes through a primary channel 35 of the bore 32 of the flow splitter 20 and is routed through port B to the hydraulic brake booster 22. Of course, for all real devices, there is some inherent loss of fluid due to clearances between individual parts.

In the condition illustrated in FIG. 2, brake assist 22 is operating below the predetermined threshold or relief pressure value and the fluid flows freely into Port A and out Port B through the channel 35. As shown, the valve body 30 may be fitted with a union fitting 36 which extends into valve bore 32 and is formed with primary channel 35 in direct flow communication with valve bore 32. The line pressure in the primary channel 35 is communicated through a pressure reducing or P-hole orifice 38 in union fitting 36 and a communication passage 40 in the valve body 30 to the back of the flow control valve 34. This pressure, along with the bias exerted by a flow control spring 42 holds valve member 34 forward against union fitting 36. In this position, valve member 34 completely covers the bypass ports C, D to the steering assist 24 and reservoir 16, respectively, such that flow neither enters nor leaves these two ports. The valve member 34 has a reservoir pressure communication groove 44 that is always exposed to Port D and thus to the reservoir pressure regardless of the position of valve member 34. This reservoir pressure is communicated to the inside of the valve through opening 46. A small poppet valve 50 separates the fluid at line pressure behind the valve member 34 from the fluid at the reservoir pressure inside valve member 34.

Turning now to FIG. 3, the condition is shown where the brake assist pressure developed by brake assist device 22 within Port B and the primary channel 35 exceeds the predetermined threshold pressure value for brake assist device 22, which is preferably set just below the relief pressure of pump 14. As the backpressure in primary channel 35 approaches the predetermined control pressure, the fluid pressure communicated to the back side of flow control valve member 34 will unseat a poppet ball 52 of poppet valve 50 which will cause some of the hydraulic oil to bleed behind the plunger 54 of valve member 34 and out to reservoir 16 through opening 46 in valve member 34 and Port D. Since P-hole orifice 38 is quite small, the communication passage pressure 40 will be lower than the line pressure within the primary channel 35 as long as the poppet valve 50 is open and bleeding oil from behind plunger 54. This pressure differential will cause plunger 54 to slide back against spring 42 from the position shown in FIG. 2 to the position shown in FIG. 3, thereby exposing Port C to the main flow of fluid discharged by pump 14 coming in through Port A. The flow from pump 14 in through Port A will thus be fed to both Port B and Port C with a significant majority of the flow being discharged through Port C bypassing the brake assist device 22 and being delivered to steering gear assist device 24 through hydraulic line 25. The flow control valve 34 thus operates to automatically meter excess oil flow through Port C when the backpressure generated by the brake assist device 22 rises to the preset control pressure which, as mentioned, is preferably set just under the relief pressure of the pump 14.

Priority valves having a different construction that divert hydraulic fluid flow such that the diverted fluid bypasses brake assist device 22 and is delivered to steering gear assist device 24 may also be employed with the present invention. For example, priority valves having a simplified construction that can be substituted for the illustrated priority valve 20 are described by Wong et al. in U.S. Utility patent application Ser. No. 11/901/821 entitled VEHICULAR HYDRAULIC SYSTEM WITH PRIORITY VALVE AND RELIEF VALVE and claiming priority from U.S. Provisional Application Ser. No. 60/845,911 filed Sep. 20, 2006; and by Wong et al. in U.S. Utility patent application Ser. No. 11/901,822 entitled VEHICULAR HYDRAULIC SYSTEM WITH PRIORITY VALVE and claiming priority from U.S. Provisional Application Ser. No. 60/845,892 filed Sep. 20, 2006, both of these utility applications having a common filing date with the present application, and wherein both of the utility applications and both of the provisional applications are assigned to the assignee of the present application and wherein each of these four utility and provisional applications are expressly incorporated herein by reference.

Figure 4:
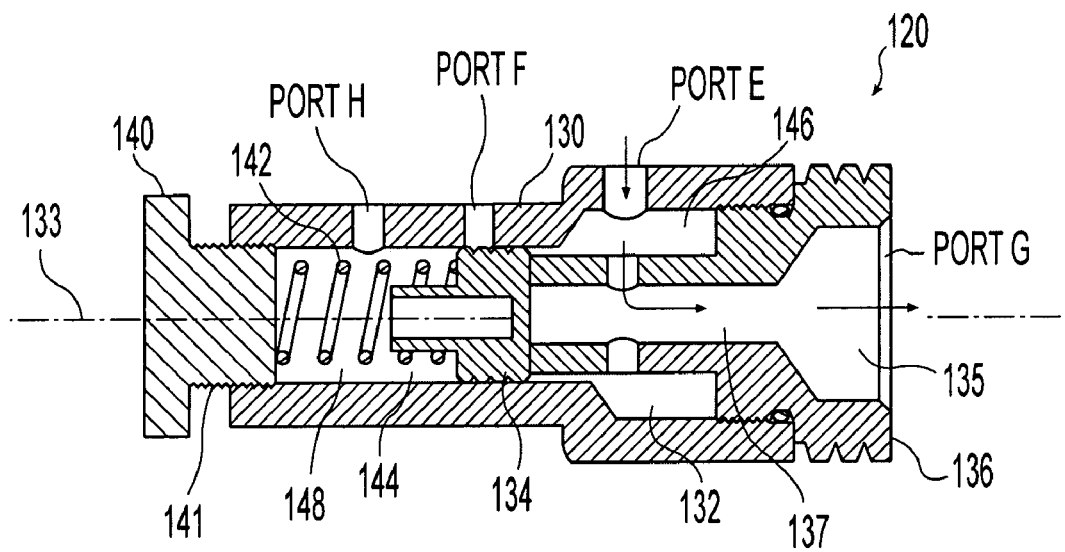
FIG. 4 is a schematic partial cross sectional view of a pressure dump valve under low pressure conditions.
Figure 5:
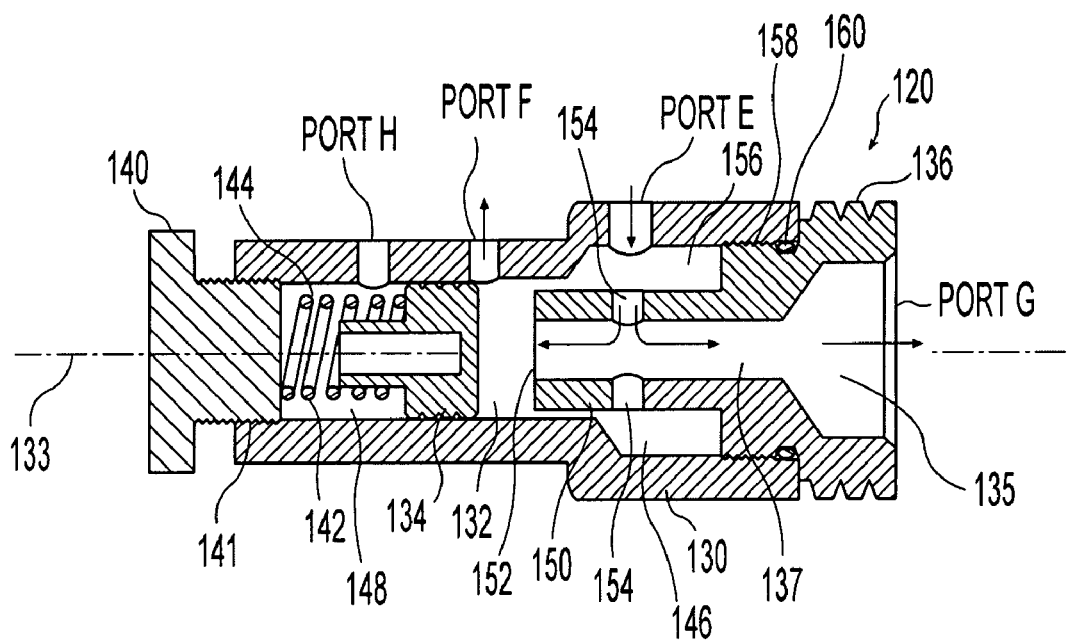
FIG. 5 is a schematic partial cross sectional view of the valve illustrated in FIG. 4 under high pressure conditions.

Hydraulic system 10 also includes a pilot operated pressure dump valve 120 to limit the maximum pressure of the hydraulic fluid that is conveyed to steering gear assist device 24. With reference to FIGS. 4 and 5, the pressure dump valve 120 includes a valve body 130 having a bore forming a valve chamber 132 in which a slideable flow control valve member 134 is accommodated. A plurality of ports are provided in the valve body 130, and are denoted in the Figures as ports E (inlet port), F (bypass port), G (outlet port) and H (low pressure port). Hydraulic fluid enters valve body 130 through inlet port E, where it flows within valve chamber 132 and is directed out of valve body 130 through one or more of the outlet ports F, G and H, depending upon the operating conditions which will now be described.

FIG. 4 shows operation of the pressure dump valve 120 under low pressure conditions wherein the pressure of hydraulic fluid entering valve 120 through Port E is below a predetermined second threshold pressure value. Such low pressure conditions may exist when there is not a significant load on steering gear assist device 24. In this condition the flow entering Port E passes through a primary flow channel 135 of valve 120 and is routed through Port G to the hydraulic steering assist device 24.

As shown, the valve body 130 may be fitted with a union fitting 136 which extends into the valve chamber 132 and defines port G of valve 120. Elongate valve chamber 132 has two cylindrical sections coaxially aligned along its axis 133, with a first cylindrical section 146 having a larger diameter than second cylindrical section 148. In the illustrated embodiment, union fitting 136 includes threads 158 engaged with corresponding threads in large cylindrical section 146 of valve chamber 132 and an O-ring 160 to provide a seal. Union fitting 136 also includes a hollow tubular portion 150 with an open end 152 that extends into valve chamber 132. Tubular portion 150 has a smaller outer diameter than the inner diameter of cylindrical section 146 of chamber 132 whereby an interstitial space 156 is defined within valve chamber 132 between tubular portion 150 and valve body 130. Tubular portion 150 also includes sidewall openings 154 which provide fluid communication between interstitial space 156 and the interior 137 of union fitting 136. Inlet port E is in fluid communication with interstitial space 156 while outlet port G is in fluid communication with interior 137 of union fitting 136. Thus, the primary fluid channel 135 through valve 120 from port E to port G is defined, in the illustrated embodiment, by interstitial space 156, sidewall openings 154 and interior volume 137 of union fitting 136.

The rear volume 144 of valve bore 132 located behind valve member 134 is at a pressure corresponding to the pressure of reservoir 16 which is communicated to rear volume 144 through port H. In the illustrated embodiment, reservoir 16 is disposed downstream of steering gear 24 and upstream of pump 14 and holds hydraulic fluid at a relatively low pressure. Valve member 134 sealingly partitions valve chamber 132 between low pressure volume 144 and primary channel 135 which is in fluid communication with Port G and the head of valve member 134 sealingly separates and prevents the migration of fluid between primary channel 135 and low pressure volume 144. The fluid pressure within rear volume 144 together with biasing force exerted by flow control spring 142 holds the valve 134 forward against the union fitting 136 when the pressure of the fluid entering Port E is relatively low. In this position, illustrated in FIG. 4, valve member 134 seals port F from fluid communication with valve chamber 132 and prevents fluid entering through Port E from leaving through either of the bypass ports F, H. Consequently, when valve 134 is in the position shown in FIG. 4, all of the fluid entering Port E is discharged through Port G and fluid neither enters nor is discharged through either of Ports F or H. Of course, for all real devices, there is some inherent loss of fluid due to clearances between individual parts.

Turning now to FIG. 5, the condition is shown where the pressure within Port G and the primary channel 135 exceeds the threshold pressure value of valve 120. (The hydraulic fluid in primary channel 135 is exposed to valve member 134 through the open end 152 of union fitting 136 when valve member 134 is in the axial position shown in FIG. 2.) This threshold pressure is determined by the combination of the fluid pressure within rear volume 144 and the biasing force exerted by spring 142. Valve 120 is designed so that this threshold pressure value limits the pressure of the fluid flowing out of Port G to a pressure that is no greater than the pressure limit value of steering gear assist device 24. As the pressure in primary channel 135 approaches the threshold pressure, the pressure exerted on valve 134 causes valve 134 to slide back against the spring 142 and the fluid pressure in rear volume 144 from the first axial position shown in FIG. 4 to the second axial position shown in FIG. 5 where it is spaced from open end 152 of tubular portion 150. In the position shown in FIG. 5, valve 134 has slid rearwardly to expose Port F to the main flow of fluid entering valve 120 through Port E. The combined flow from the outlet of braking assist device 22 and Port C of valve 20 which enters Port E will thus be fed to both Port G and Port F. As a result, the pressure of the fluid within primary channel 135 and the hydraulic line extending between Port G and the inlet to steering gear assist device 24 is relieved and the pressure of the fluid within primary channel 135 and at Ports E and G will be reduced. The flow control valve member 134 thus operates to limit the maximum pressure of the hydraulic fluid at the inlet to steering gear assist device 24.

If the pressure within primary channel 135 continues to rise after port F has been exposed, valve member 134 will continue to slide rearwardly within valve chamber 132. While it is possible to design valve chamber 132, port H and valve member 134 such that port H would eventually be exposed due to such a continued rise in pressure, the configuration of the illustrated pressure dump valve 120 does not allow valve member 134 to expose port H to the fluid flow within primary channel 135.

The use of pressure dump valve 120 enables the use of a steering gear device 24 that has a pressure relief value that is less than that of the brake assist device 22. In a hydraulic circuit having a steering gear device with a pressure relief value less than that of the brake assist device, pressure dump valve 120 will operate to prevent the pressure of hydraulic fluid at the inlet to steering gear assist device 24 from exceeding the pressure limit value of steering gear assist device 24 while priority valve 20 operates to prevent the pressure of hydraulic fluid at the inlet to brake assist device 22 from exceeding the pressure limit value of braking assist device 24. By setting a first threshold pressure value at which priority valve 20 relieves pressure at the inlet to brake assist device 22 higher than the second threshold pressure value at which pressure dump valve 120 relieves pressure at the inlet to steering gear assist device 24, a brake assist device 22 can be used together with a steering gear assist device 24 wherein the steering gear assist device 24 has a lower pressure limit value than that of the brake assist device 22. Valve 120 is designed so that when conditions arise that result in the pressure of the hydraulic fluid entering valve 120 through Port E to drop to a level that is no longer greater than the pressure limit value of steering gear assist device 24, valve member 134 will slide forward and return to the position shown in FIG. 4.

Valve 120 provides a pressure-dump valve having a relatively simple and readily manufactured construction with elongate valve chamber 32, inlet port E, bypass port F, outlet port G and low pressure port H being the sole fluid communication channels defined by valve 120. In the illustrated embodiment, elongate valve member 132 has two cylindrical sections 146, 148 of differing diameters as mentioned above. Valve member 134 is located in the smaller diameter portion 48 with the primary flow channel 135 extending through the larger diameter portion 146. Ports E and G are in fluid communication with larger diameter portion 146 while ports F and H are in fluid communication with the smaller diameter portion 148.

Valve 120 also includes a threaded plug 140 that is operably coupled with biasing member 142. In the illustrated embodiment, as can be seen in FIGS. 4 and 5, biasing member 142 takes the form of a helical spring engaged with valve member 134 at one end and a threaded plug 140 on its opposite end. Plug 140 has helical threads 141 engaged with cooperating threads formed in valve bore 132 and the axial position of plug 140 can be adjusted by rotating plug 140 relative to valve body 130. The use of such a threaded plug 140 allows the biasing force exerted by spring 142 on valve member 134 to be externally adjusted after assembly of valve 120 by simply turning plug 140 relative to valve body 130. In the event that the control pressure value at which valve member 134 first exposes Port F requires adjustment after installation of priority valve 120, a threaded plug 140 makes such an adjustment considerably easier. Alternative embodiments of priority valve 120 wherein plug 140 is press fit into valve body 130 and is not externally adjustable or where valve body 130 is provided with a blind bore, are, however, also within the scope of the present invention.

In an alternative embodiment of valve 120, it is envisioned that Port H could be exposed the ambient pressure whereby the control pressure would not be dependent upon the pressure within reservoir 16. In such an alternative embodiment, seals located on valve member 134 would be used to prevent leakage of the hydraulic fluid. Additional seals arranged between the environment and valve member 134 might also be employed to prevent both leakage and the contamination of the hydraulic fluid.

As evident from the description presented above, hydraulic circuit 10 includes, in series arrangement and in serial order, hydraulic pump 14, priority valve 20, brake booster device 22, pressure dump valve 120, steering gear device 24 and reservoir 16. When valve 20 is not diverting a portion of the fluid flow through port C to bypass brake booster device 22 as occurs when brake booster 22 is generating a relatively high back pressure, a substantial majority of the fluid flow discharged from pump 14 will flow along a primary flow path 11 that extends from the outlet of pump 14, through discharge line 18, through valve 20 from port A to port B along primary flow channel 35, through hydraulic line 19 to brake booster 22 and through hydraulic line 125 to pressure dump valve 120. When valve 120 is not dumping high pressure fluid through port F, as occurs when steering gear device 24 is generating a relatively high back pressure, a substantial majority of the fluid flow in line 125 will continue to flow along primary flow path 11 which further extends through valve 120 from port E to port G along primary flow channel 135, through hydraulic line 123 to steering gear 24, through hydraulic line 27 to reservoir 16 and then to the inlet of pump 14 wherein the cycle is repeated. As described above, when the pressure upstream of brake booster 22 is elevated to a first threshold value, valve 20 will split the fluid flow at valve 20 with a portion being communicated to port B in the primary flow path upstream of brake booster 22 and another portion of the fluid flow being diverted through bypass port C to hydraulic line 25 which communicates the fluid to a point in the primary flow path downstream of brake booster 22 and upstream of steering gear device 24 in hydraulic line 125. Similarly, when the pressure upstream of steering gear 24 is elevated to a second threshold value, valve 120 will split the fluid flow at valve 120 with a portion being communicated to port G in the primary flow path upstream of steering gear 24 and another portion of the fluid flow being diverted through bypass port F to a point in the primary flow path 11 downstream of steering gear 24 and upstream of pump 14.

While the present invention has been described above with reference to a hydraulic system that combines both a steering gear assist device and a brake assist device, it may also be employed with other hydraulic devices and systems. For example, it is known to employ a single hydraulic fluid pump to power the fluid motor of a steering assist device and a second fluid motor associated with a radiator cooling fan. U.S. Pat. No. 5,802,848, for example, discloses a system having a steering gear assist device and a radiator cooling fan with a fluid motor powered by a single hydraulic fluid pump and is incorporated herein by reference. In alternative embodiments of the present invention, the priority valve and pressure dump valve arrangement disclosed herein could be employed to facilitate the use of a single hydraulic fluid pump to power the fluid motors of both a steering gear assist device and that of a radiator cooling fan.

Furthermore, the priority valve and pressure dump valve arrangement of the present system could be used to control the fluid flow associated with two hydraulic devices (e.g., a brake assist device, a steering gear assist device, a radiator fan having a fluid motor, or other hydraulic device), or two hydraulic circuits, wherein the priority valve and pressure dump valve arrangement and the two associated hydraulic devices or circuits, form one portion of a larger complex hydraulic circuit.

In still other embodiments, a pressure dump valve as described herein could be used in a hydraulic circuit without a priority valve. For example, a pressure dump valve as described herein could be used in an integrated hydraulic circuit having both a brake assist device and a steering gear assist device but not a priority valve. In such a circuit, the pressure dump valve could enable the use of a steering gear assist device having a lower pressure relief value than that of the brake assist device or simply to relieve the pressure of the hydraulic fluid at the inlet of the steering gear device when it exceeded a predetermined value. Additionally, a pressure dump valve as described herein, could be employed in a conventional hydraulic circuit for a steering gear assist device that does not include any other hydraulic devices to limit the pressure of the hydraulic fluid at the inlet of the steering gear assist device.

It is also possible for pressure dump valve 120 to be used in a hydraulic circuit having a reservoir disposed near pump 14 and a remote reservoir or sump disposed near valve 120. This use of dual reservoirs would not only position a pool of hydraulic fluid near both pump 14 and valve 120 but could also be used to increase the overall quantity of hydraulic fluid in the hydraulic circuit and thereby increase the heat sink capacity of the hydraulic fluid within the circuit.

While this invention has been described as having an exemplary design, the present invention may be further modified within the spirit and scope of this disclosure. This application is therefore intended to cover any variations, uses, or adaptations of the invention using its general principles.

What is claimed is:

1. A vehicular hydraulic system comprising:
   a hydraulic circuit having, arranged in series and in serial order along a primary flow path, a hydraulic pump, a first hydraulic application, and a second hydraulic application; and
   wherein said hydraulic circuit further includes a pressure-dump valve having a valve body and a valve member; said valve body defining an elongate valve chamber defining an axis wherein said valve member is axially slidable within said chamber between a first axial position and a second axial position and sealingly partitions said chamber into a primary flow channel and a low pressure volume; said valve body further defining an inlet port in fluid communication with said primary flow channel; an outlet port in fluid communication with said primary flow channel, a low pressure port in fluid communication with said low pressure volume and a bypass port, said bypass port being disposed at an axially intermediate position with said low pressure port being disposed on one side of said bypass port and said inlet port and said outlet port being disposed on the opposing axial side of said bypass port, said bypass port being sealed from fluid communication with said valve chamber when said valve member is in said first axial position and said bypass port being in fluid communication with said primary flow channel when said valve member is in said second axial position, said valve member being axially displaced from said first axial position to said second axial position when the fluid pressure in said primary flow channel is elevated to a second threshold value; and wherein said pressure-dump valve is operably disposed in said hydraulic circuit downstream of said first hydraulic application and upstream of said second hydraulic application wherein said primary flow path extends from said first hydraulic application to said inlet port, through said primary flow channel and said outlet port of said valve to said second hydraulic application; said bypass port being in fluid communication with said primary flow path at a point downstream of said second hydraulic application and upstream of said hydraulic pump; and wherein the hydraulic fluid pressure in said primary flow path immediately upstream of said first hydraulic application can be elevated to a first threshold value and wherein said first threshold value is greater than said second threshold value.

2. The vehicular hydraulic system of claim 1 wherein said pressure-dump valve further comprises a union fitting secured to said pressure dump valve at one of said inlet and outlet ports, said union fitting defining a fluid channel therethrough and projecting into said primary flow channel, said valve member being engaged with said union fitting when said valve member is in said first axial position, said valve member being axially spaced from said union fitting when said valve member is in said second axial position.

3. The vehicular hydraulic system of claim 1 further comprising:
a biasing member disposed within said low pressure volume of said pressure-dump valve and axially biasing said valve member toward said first axial position; and
a threaded member operably coupled with said biasing member, said threaded member being externally axially repositionable wherein axial repositioning of said threaded member adjusts said second threshold value.

4. The vehicular hydraulic system of claim 1 further comprising a hydraulic reservoir disposed downstream of said second hydraulic application and upstream of said pump, said low pressure port being in fluid communication with said hydraulic reservoir.

5. The vehicular hydraulic system of claim 1 wherein said valve chamber comprises a first substantially cylindrical section and a second substantially cylindrical section wherein said first and second cylindrical sections are disposed coaxially and said first cylindrical section defines a larger diameter than said second cylindrical section; said inlet port and said outlet port being in fluid communication with said first cylindrical section, said low pressure port and said bypass port being in fluid communication with said second cylindrical portion;

a union fitting disposed in a first one of said inlet and outlet ports, said union fitting defining a fluid channel therethrough and having a hollow tubular portion with an open end projecting into said first cylindrical section, at least one sidewall opening in said tubular portion providing fluid communication between said fluid channel and an interstitial space defined between said tubular portion and said first cylindrical section, a second one of said inlet and outlet ports being in fluid communication with said interstitial space, said valve member being engaged with said open end of said tubular portion and exposed to fluid within said fluid channel when said valve member is in said first axial position, said valve member being axially spaced from said open end of said tubular portion when said valve member is in said second axial position.

6. The vehicular hydraulic system of claim 5 further comprising:

a biasing member disposed within said second cylindrical section and biasing said valve member into engagement with said union fitting; and
a threaded member engaged with said valve body proximate an end of said second cylindrical section and operably coupled with said biasing member, said threaded member being externally axially repositionable wherein axial repositioning of said threaded member adjusts said second threshold value.

7. The vehicular hydraulic system of claim 1 wherein said first hydraulic application is a hydraulic brake booster device.

8. The vehicular hydraulic system of claim 1 wherein said second hydraulic application is a hydraulic steering gear device.

9. The vehicular hydraulic system of claim 1 further comprising a flow-splitting valve operably disposed in said hydraulic circuit downstream of said pump and upstream of said first hydraulic application, said flow-splitting valve communicating substantially all hydraulic fluid flowing therethrough to said primary flow path at a point upstream of said first hydraulic application when the pressure of the hydraulic fluid flowing therethrough is below said first threshold value; said flow-splitting valve splitting the hydraulic fluid flow therethrough into a first fluid flow which is communicated to said primary fluid path upstream of said first hydraulic application and a second fluid flow which is communicated to said primary fluid path at a point downstream of said first hydraulic application and upstream of said pressure-dump valve when the pressure of the hydraulic fluid flowing through said flow-splitting valve exceeds said first threshold value.

10. A vehicular hydraulic system comprising:
a hydraulic circuit having, arranged in series and in serial order along a primary flow path, a hydraulic pump, a hydraulic brake booster device, and a hydraulic steering gear device; and
wherein said hydraulic circuit further includes a pressure-dump valve having a valve body and a valve member; said valve body defining an elongate valve chamber defining an axis wherein said valve member is axially slidable within said chamber between a first axial position and a second axial position and sealingly partitions said chamber into a primary flow channel and a low pressure volume; said valve body further defining an inlet port in fluid communication with said primary flow channel; an outlet port in fluid communication with said primary flow channel, a low pressure port in fluid communication with said low pressure volume and a bypass port, said bypass port being disposed at an axially intermediate position with said low pressure port being disposed on one side of said bypass port and said inlet port and said outlet port being disposed on the opposing axial side of said bypass port, said bypass port being sealed from fluid communication with said valve chamber when said valve member is in said first axial position and said bypass port being in fluid communication with said primary flow channel when said valve member is in said second axial position, said valve member being axially displaced from said first axial position to said second axial position when the fluid pressure in said primary flow channel is elevated to a threshold value, and wherein said elongate valve chamber, said inlet port, said outlet port, said bypass port and said low pressure port are the sole fluid communication channels defined by said pressure-dump valve; and wherein said pressure-dump valve is operably disposed in said hydraulic circuit downstream of said brake booster device and upstream of said steering gear device wherein said primary flow path extends from said brake booster device to said inlet port, through said primary flow channel and said outlet port of said valve to said steering gear device; said bypass port being in fluid communication with said primary flow path at a point downstream of said steering gear device and upstream of said hydraulic pump; and wherein the hydraulic fluid pressure in said primary flow path immediately upstream of said brake booster device can be elevated to a first threshold value and wherein said first threshold value is greater than said second threshold value.

11. The vehicular hydraulic system of claim 10 further comprising a flow-splitting valve operably disposed in said hydraulic circuit downstream of said pump and upstream of said brake booster device, said flow-splitting valve communicating substantially all hydraulic fluid flowing therethrough to said primary flow path at a point upstream of said brake booster device when the pressure of the hydraulic fluid flowing therethrough is below said first threshold value; said flow-splitting valve splitting the hydraulic fluid flow therethrough into a first fluid flow which is communicated to said primary fluid path upstream of said brake booster device and a second fluid flow which is communicated to said primary fluid path at a point downstream of said brake booster device and upstream of said pressure-dump valve when the pressure of the hydraulic fluid flowing through said flow-splitting valve exceeds said first threshold value.

12. The vehicular hydraulic system of claim 11 wherein said pressure-dump valve further comprises a union fitting secured to said pressure-dump valve at one of said inlet and outlet ports, said union fitting defining a fluid channel therethrough and projecting into said primary flow channel, said valve member being engaged with said union fitting when said valve member is in said first axial position, said valve member being axially spaced from said union fitting when said valve member is in said second axial position.

13. The vehicular hydraulic system of claim 11 further comprising:
  a biasing member disposed within said low pressure volume of said pressure-dump valve and axially biasing said valve member toward said first axial position; and
  a threaded member operably coupled with said biasing member, said threaded member being externally axially repositionable wherein axial repositioning of said threaded member adjusts said second threshold value.

14. The vehicular hydraulic system of claim 11 further comprising a hydraulic reservoir disposed downstream of said steering gear device and upstream of said pump, said low pressure port being in fluid communication with said hydraulic reservoir.

15. The vehicular hydraulic system of claim 11 wherein said valve chamber comprises a first substantially cylindrical section and a second substantially cylindrical section wherein said first and second cylindrical sections are disposed coaxially and said first cylindrical section defines a larger diameter than said second cylindrical section;
  said inlet port and said outlet port being in fluid communication with said first cylindrical section, said low pressure port and said bypass port being in fluid communication with said second cylindrical portion;
  a union fitting disposed in a first one of said inlet and outlet ports, said union fitting defining a fluid channel therethrough and having a hollow tubular portion with an open end projecting into said first cylindrical section, at least one sidewall opening in said tubular portion providing fluid communication between said fluid channel and an interstitial space defined between said tubular portion and said first cylindrical section, a second one of said inlet and outlet ports being in fluid communication with said interstitial space, said valve member being engaged with said open end of said tubular portion and exposed to fluid within said fluid channel when said valve member is in said first axial position, said valve member being axially spaced from said open end of said tubular portion when said valve member is in said second axial position.

16. The vehicular hydraulic system of claim 15 further comprising:
  a biasing member disposed within said second cylindrical section and biasing said valve member into engagement with said union fitting; and
  a threaded member engaged with said valve body proximate an end of said second cylindrical section and operably coupled with said biasing member, said threaded member being externally axially repositionable wherein axial repositioning of said threaded member adjusts said second threshold value.

* * * * *